April 1, 1958 W. J. SMITH 2,828,946
AIR HEATER
Filed Dec. 29, 1954 2 Sheets-Sheet 1

INVENTOR
WILLIAM J. SMITH

BY
ATTORNEY

April 1, 1958 W. J. SMITH 2,828,946
AIR HEATER
Filed Dec. 29, 1954 2 Sheets-Sheet 2

INVENTOR
WILLIAM J. SMITH

BY *Jules H. Steinberg*
ATTORNEY

United States Patent Office 2,828,946
Patented Apr. 1, 1958

2,828,946

AIR HEATER

William J. Smith, Delaware City, Del., assignor to E. I. du Pont de Nemours and Company, Wilmington, Del., a corporation of Delaware Application December 29, 1954, Serial No. 478,317

2 Claims. (Cl. 257—216)

The present invention relates to an improved apparatus for heating air or other gaseous substance by contact with a suitable heating medium such as hot flue gases or hot gaseous products of combustion. More particularly the invention pertains to such an apparatus susceptible of general utility in a variety of presently existing industrial processes wherein it desired to transfer heat from one flowing body of gases to air or another flowing body of gases.

The invention is concerned with a heat exchange mechanism having a corrugated core which serves as the heat exchange surface; air being passed into alternate grooves on one side of the corrugated surface and the hot gases being passed into the remaining alternate grooves on the other side of the corrugated surface. The invention may best be understood by a consideration of the following detailed description of a illustrative embodiment thereof when read in conjunction with the accompanying drawings in which.

Throughout the drawings like numerals designate identical parts.

Figure 2:
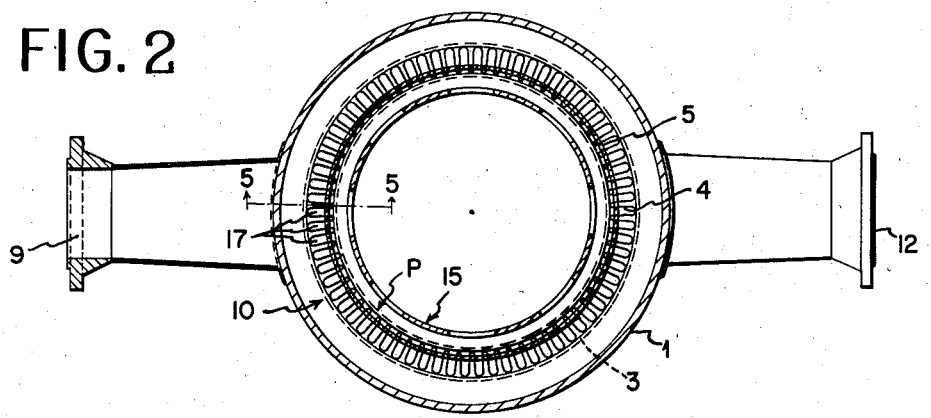
Figure 2 is the transverse sectional view of the line 2—2 of Figure 2.

In the apparatus illustrated, numeral 1 designates the outer casement of the heat exchange mechanism. The casement encloses a corrugated heat exchange core 4 and is separated therefrom by a high temperature insulation medium 2 and an insulation retainer liner 3. The entire apparatus is supported from a body flange 8 which in turn may be mounted on a separate support mechanism or, more likely, on a neighboring piece of equipment. Seal-welded to the inner periphery of body flange 8 is a metal bellows 6 which is integrally connected to the corrugated heat exchange core 4 by a coupling ring 5. A plug member designated in its entirety by P has an annular projection 7 at its upper end which rests in a mating annular groove in the body flange 8. The plug thus rests within the core of the apparatus and may be removed at any time by simply elevating it.

Figure 4:
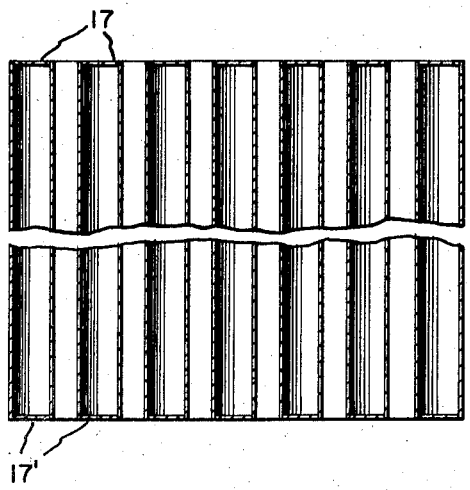
Figure 4 is a longitudinal cross-sectional view of a portion of the corrugated heat exchange surface taken along the line 4—4 of Figure 3.
Figure 5:
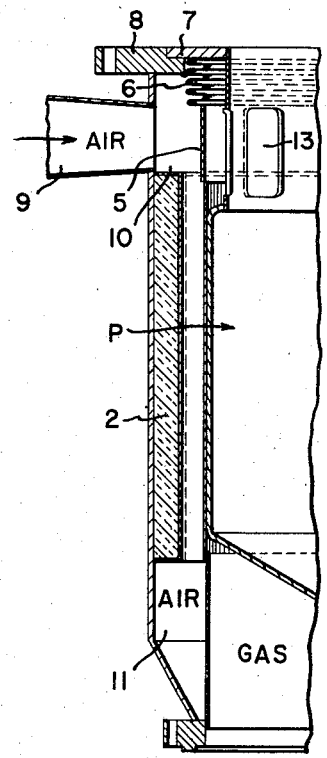
Figure 5 is a partial section taken on line 5—5 of Figure 2 in a plane through an air-side corrugation of the core of a portion of the device.

Air enters the apparatus through the intake orifice 9 and flows into the annular plenum chamber 10. The latter chamber communicates only with alternate grooves of the heat exchange surface, which may be termed the "air grooves," the remaining alternate grooves being sealed off at the top and bottom by caps 17 and 17', as best illustrated in Figure 4. The air flows downwardly, as viewed in Figure 1 in the air grooves which are all on one side of the heat exchange surface 4 until it reaches the annular discharge plenum chamber 11 whence it flows out of the apparatus by means of discharge orifice 12.

Figure 1:
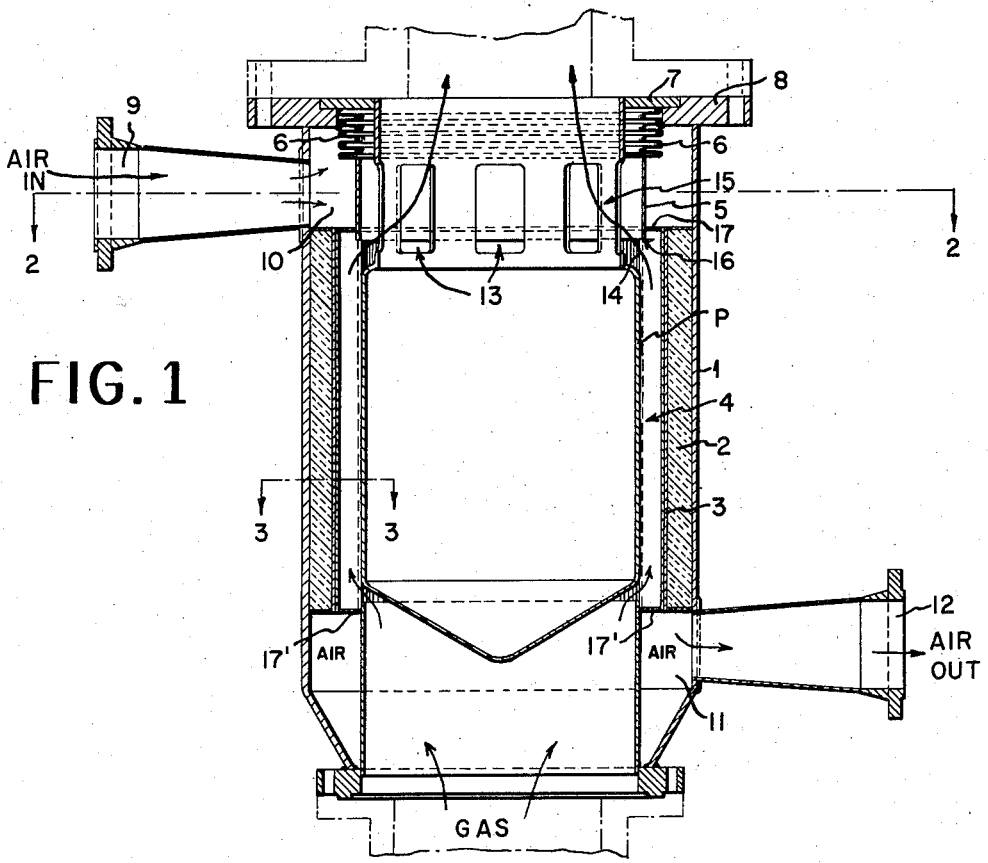
Figure 1 is a sectional elevation view of a heat exchange apparatus embodying the present invention in a plane through a gas-side corrugation of the core.
Figure 3:
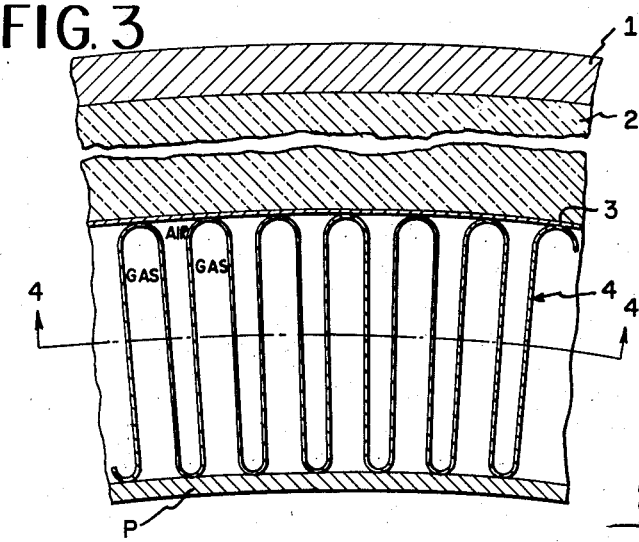
Figure 3 is a section taken along the line 3—3 of Figure 1.

The hot gases enter the apparatus from the bottom, as viewed in Figure 1, and rise upwardly in the core until diverted by the bottom of plug P into the alternate grooves of the corrugated core 4 on the gas side thereof, which may be termed the "gas grooves." Caps 17' at the base of the gas grooves prevent the gas from entering the annular air discharge plenum chamber 11. The hot gas flows upwardly through the gas grooves, as seen in Figure 1, until caps 17 prevent it from travelling any farther and force it out of the grooves and into the space above the shank of the plug indicated in Figure 2 at 14. The plug has a section 15 in this area, of reduced cross-section which is provided with an annular series of space peripheral holes 13 about its circumferential extent. The gas which has just been released from the upper end of the gas-grooves at 14 is confined within the area defined by the ring 5 and bellows 6 on the one side and projection 7 and plug P on the other side. Holes 13 provide the only path through which the gas may continue to flow and thus provide a discharge orifice for the gas from the apparatus.

The function of bellows 6 is to provide a single unitary compensation means to accommodate the expansion of the corrugated core 4, which will be considerably greater than the corresponding expansion of casement 1 due to the difference in the metallic composition of the two elements and/or the temperatures to which they will be subjected. Insulation 2 will maintain casement 1 at a considerably lower temperature than that of core 4. The flexible bellows 6 is thus able to "take up" the increased expansion of the core 4 and prevent any disturbance of the necessary seals in the apparatus.

The upper end of the inner ridges of the corrugated heat exchange core are flattened, as at 16, by an amount equal to the thickness of the coupling ring 5 in order to provide a better welding surface and to permit the ring 5 to lie within the plane of the core in order that plug P may be easily removed and reinserted.

Where the pressure differential between the air and gas sides of corrugated core 4 is likely to be great, vertical support bars or horizontal reinforcing ties (not shown) may be fixed in abutting or wedging contact with the walls of the corrugated grooves on the low pressure side. Alternatively, or in addition to such support bars or ties, the corrugated core itself may be fabricated to withstand high pressure differentials between its opposite surfaces by the use of suitably spaced crimp-formed ribs which are stamped or pressed directly into the core. Either or both of these reinforcing expedients will greatly stiffen the core and strengthen its resistance to collapse under pressure stress.

It will be readily apparent from the foregoing that the present invention provides a compact and convenient heat exchange unit for transferring the heat from combustion or other hot gases to a counter-flowing stream of air. The apparatus occupies a relatively small amount of space while providing a large heat exchange area between the counter-flowing gases. The central plug may be removed by merely lifting it from its resting place on the body flanges 8, which permits easy access to the center of the apparatus for cleaning or repair purposes.

While an illustrative embodiment of the invention has been shown and described in detail, it will be understood that many changes and variances may be made without departing from the scope of the invention, and therefore, it is my intention to be limited only by the following claims:

I claim:

1. A heat exchange apparatus comprising an outer casement, a corrugated core within said casement serving as the heat exchange surface, insulation means between said casement and said core, a metal bellows elastically interconnecting said casement and said core, a removable plug member within said core and in direct contact with the inner corrugations thereof, the grooves formed by said last-named corrugations being capped at their extremities, a hot gas intake at the bottom of said apparatus directing hot gases against the base of the plug which diverts them into said grooves, a gas discharge orifice at the remote end of said apparatus, a cool air intake at the same end of said apparatus as the gas discharge orifice and conduit means for conducting said air into said apparatus and along that side of the core opposite the gas side and thereafter discharging said air from said apparatus.

2. In an apparatus of the type described, a support member; an outer casement secured to said support member; a corrugated core within said casement serving as the heat exchange surface; insulation means between said casement and core, said core being adjustably connected to said casement by a metal bellows; a second support member removably resting on said first-named support member; a removable plug member within said core in close proximity to the inner corrugations thereof supported by said second support member, the grooves formed by said last-named corrugations being capped at their extremities; a hot gas intake at the base of said apparatus directing hot gases against the end of the plug whence they are diverted into said grooves; a discharge vent for the gases at the remote end of said apparatus; a cool air intake at the same end of the apparatus as the gas discharge vent; and conduit means for conducting air from said intake into said apparatus and along that side of the corrugated core opposite to which the gas is flowing and thereafter discharging said air from said apparatus.

References Cited in the file of this patent

UNITED STATES PATENTS

| | | |
|---|---|---|
| 2,401,032 | Williams | May 28, 1946 |
| 2,424,765 | McCollum | July 29, 1947 |
| 2,468,903 | Villiger | May 3, 1949 |
| 2,576,213 | Chausson | Nov. 27, 1951 |

FOREIGN PATENTS

| | | |
|---|---|---|
| 320,279 | Great Britain | Oct. 10, 1929 |